June 13, 1950 H. G. HOOVER 2,511,405
GAS FUEL TWO-CYCLE INTERNAL-COMBUSTION ENGINE
Filed April 27, 1946

INVENTOR.
Harmer G. Hoover
BY
ATTORNEY.

Patented June 13, 1950

2,511,405

UNITED STATES PATENT OFFICE 2,511,405

GAS FUEL TWO-CYCLE INTERNAL-
COMBUSTION ENGINE

Harmer G. Hoover, Brooklyn, N. Y.

Application April 27, 1946, Serial No. 665,581

5 Claims. (Cl. 123—69)

This invention relates to two-cycle internal combustion engines, and particularly to those in which gas or vapor is used as a fuel, and provides improvements thereon.

Internal combustions using gas as a fuel (two-cycle as well as four-cycle) are in wide use, being used widely where natural gas, producer gas, sewerage gas from sewerage disposal plants, etc. are available, and are recognized in the art as having distinctive characteristics. They are recognized as normally detonating on combustion of the charge, engine cards being very ragged at the high end of the combustion curve, transmit an unusual amount of heat to the water used for cooling, do not have any considerable overload capacity, do not perform well at loads under the rated load, and idle poorly.

The present invention provides a two-cycle internal combustion engine in which gas is used as a fuel, which runs with a complete absence of detonation, loses much less heat through the cooling system than gas fueled engines, heretofore in use, performs well at very considerable overleads, works exceptionally well at light loads, and idles well.

Tests of an engine constructed according to the present invention, running on natural gas, have demonstrated complete absence of detonation, less fuel consumption per horsepower than its nearest competitor, capacity to run at substantial overloads, smooth running at all loads, capability of idling well, and a greatly reduced loss of heat to the cooling system than its nearest competitor.

The invention is a combination of elements, most of which are known, in a new and novel arrangement or cooperative relationship, accomplishing new and improved results.

Generally stated, the invention comprises a cylinder, having inlet and exhaust ports at the lower end of the cylinder, the inlet ports admitting air for charging and scavenging, at the piston-position where the crank is moving in an arc passing through lower dead-center, in a column which rises within the cylinder at one side thereof, means for introducing gas fuel at the top of the cylinder in a counter column, means for imparting a vigorous turbulence to the combustible mixture on the approach of the piston to the end of the compression stroke, and means for igniting the compressed turbulent combustible mixture.

An embodiment of the invention is illustrated in the accompanying drawing; the invention may, however, receive other embodiments than that herein specifically illustrated and described.

Figure 1:
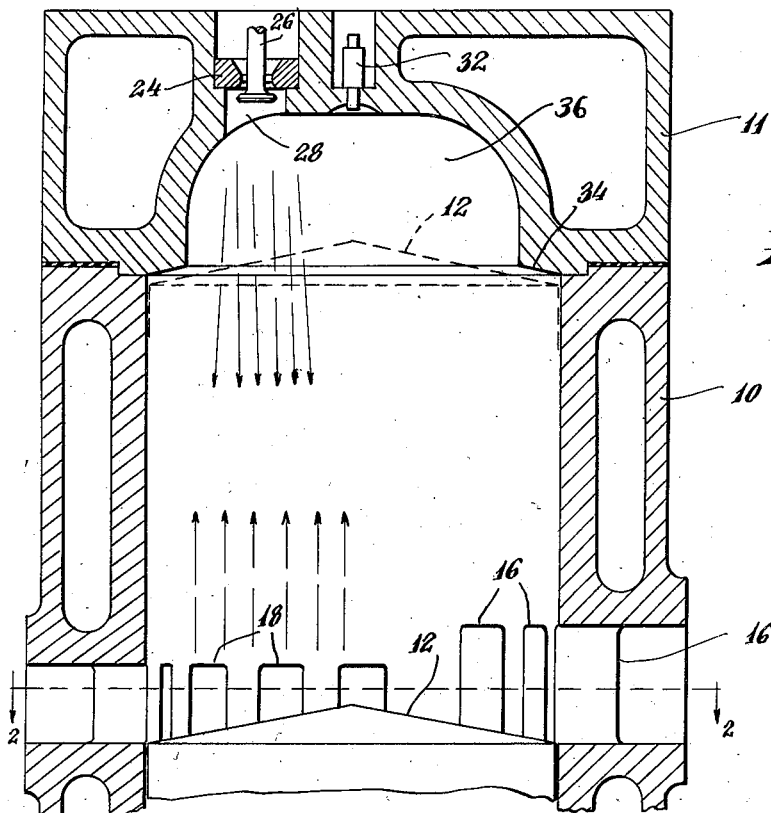
Fig. 1 is a vertical sectional view illustrating said embodiment, and showing so much of a two-cycle engine as is necessary for those skilled in the art to readily understand the invention.

Referring to said drawings, numeral 10 designates the cylinder of the internal combustion engine, 11 the head, and 12 the piston. The cylinder is provided at its lower end with exhaust ports 16, and arranged at one side of the cylinder is a series of inlet ports 18, also at the lower end of the cylinder opposite the exhaust ports. The series of inlet ports 18 is constructed and arranged to admit air to the cylinder, on the uncovering of the inlet ports by the piston 12, in a column which rises within the cylinder at one side thereof. The ports are directed toward an axis 20, between the cylinder axis 21 and the inlet port side of the cylinder, the end ports being directed backwardly toward the inlet side of the cylinder. The inlet and exhaust ports are constructed according to Patent 1,777,827, Oct. 7, 1930, and Patent 1,780,175, Nov. 4, 1930. The charging and scavenging means described above enables good scavenging to be accomplished at air pressures ranging from slightly higher than atmospheric pressure, upward. The dotted outline a, inside of the cylinder (at one side) is to schematically illustrate the rising column of air in the cylinder.

Numeral 24 designates a means for introducing gas fuel at the top of the cylinder in a downwardly directed column. The gas fuel introducing means comprises a valve 26, and a means or nozzle 28, inwardly beyond the valve, the function of the nozzle being to limit the lateral flow of the gas fuel in the stream flowing therethrough so that the gas fuel enters the cylinder substantially in the form of a flowing column of cylindrical form. Gas inlet valves of internal combustion engines are usually of the poppet valve type, such as the one shown, and, with the usual construction, the stream of gas fuel flowing through the valve opening is deflected by the poppet valve against the sides of the cylinder and head, in the shape of a hollow cone, and a less effective mixture with the air in the cylinder is obtained than with the construction where the sides of the nozzle confine the lateral expansion of the gas, so that the stream of gas fuel enters the cylinder in the nature of a column of cylindrical form. The preferred location of the gas inlet is approximately in line with the axis of the rising column of air in the cylinder, though it has been demonstrated that it may be located in the center of the cylinder head 11, without losing the benefits of the invention. Numeral 32 designates a means for igniting the combustible mixture, which may have the form of a spark plug, as here shown.

Means are provided for imparting a vigorous turbulence to the combustible mixture on the approach of the piston to the end of the compression stroke. This means comprises a shoulder 34 on the head 11 projecting inwardly over the top of the cylinder, and functions in coaction with the top of the piston. A chamber 36 in the head 11 has a wide opening into the cylinder bore and receives swirling currents of the combustible mixture squeezed between the shoulder 34 and the top of the piston. The diameter of the opening inside of shoulder 34 approximates the diameter of the cylinder bore, and is such that thorough scavenging of the combustion products by the scavenging air may be effected, and also such that the column of gas fuel entering through the nozzle 28 flows without obstruction into the side of the cylinder bore at which the column of air entering through the inlet ports 18, rises.

Operation

Figure 2:
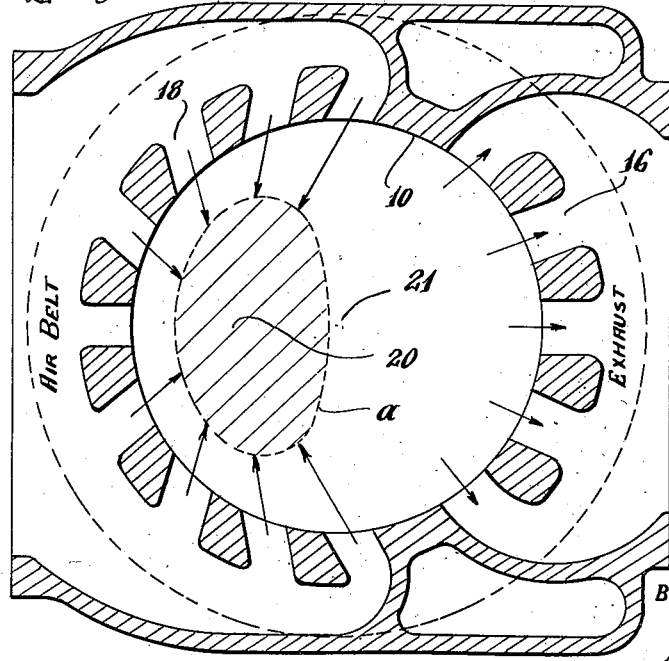
Fig. 2 is a cross-section of the parts shown in Fig. 1, the section being at the port level of the cylinder.

When the inlet ports 18 are uncovered by the piston 12 (position shown in Fig. 1), air under pressure enters the ports, and by reason of the port construction and arrangement heretofore explained, the streams meet at one side of the cylinder and form an upwardly rising column of air at one side of the cylinder, shown schematically by the dotted line a, Fig. 2. Meanwhile the exhaust gas is escaping from the exhaust ports 16. The rising column of air at one side of the cylinder when it meets the head 11, turns and flows down the other side displacing the residue of the exhaust gas ahead of it. The timing of the piston movement is such as to cut off the exhaust ports 18 about the time the last of the exhaust gas passes out of the exhaust ports 16. With the arrangement shown, it is possible to obtain a satisfactory scavenging with a quantity of air amounting to one cylinder volume. The valve 26 controlling the admission of gas fuel to the cylinder is arranged to open slightly before the piston 12 closes the air inlet ports 18 on its compression stroke. The gas-fuel, under suitable pressure to give good penetration into the air, flows into the top of the cylinder, and is prevented from widely spreading by the sides of the nozzle 28, thereby entering in substantially a downflowing column. Introduction of the gas-fuel through the valve 26 continues after the inlet ports 18 are closed, until a quantity sufficient to form a combustible mixture has been introduced, the time of the closing being also governed by the rise of pressure within the cylinder to an amount which would cause a backflow of the gas fuel through valve 26. The opening and closing of the valve 26 is effected through a cam (not shown), the design and setting of which is well understood by persons skilled in the art. As the stream of entering gas fuel is kept away from the sides of the head and cylinder, a good dispersal or mixture with the air within the cylinder is obtained. Moreover, by the time the gas fuel begins to enter the cylinder, the column of air rising at one side of the cylinder, has turned, so that the head of the cylinder is entirely filled with air, and there is no loss of gas fuel in the exhaust gas which passes out of the cylinder, or in any small quantity of air which passes out of the cylinder in the process of scavenging.

As the piston 12 continues to rise on its compression stroke, an annulus of the combustible mixture between the top of the piston and the shoulder 34, is squeezed, resulting in swirls directed inwardly of the cylinder. This swirling increases as the piston rises, and is very intense on the near approach of the top of the piston to the shoulder 34. It has been demonstrated in practice that this vigorous turbulence of the combustible mixture at the time of ignition is essential to obtaining combustion without detonation. Increase of the amount of gas fuel introduced into the cylinder, for running at loads above rated capacity, and decrease of the amount of gas fuel introduced, for running at loads below rated capacity, are obtained by varying the pressure at which the gas fuel is introduced, which is in accordance with usual practice, except that with gas-fueled engines heretofore in use satisfactory operation is not obtained with any considerable variation in the amount of gas-fuel introduced above or below the amount designed for running the engine at rated capacity. To obtain smooth running at light loads, it is necessary to throttle the air supply as well as the gas fuel supply.

Some of the benefits of the present invention should be obtained with two-cycle engines, fueled with vaporized fuel such as vaporized gasoline and vaporized kerosene, and are to be considered as being within the scope of the claims.

What is claimed is:

1. A two-cycle internal combustion engine of the type in which natural gas is used as a fuel, comprising a cylinder, a piston, means for introducing air only into the lower part of the cylinder in a column rising at one side of the cylinder, and means for introducing, on the compression stroke of the piston, only gas fuel, at the top of the cylinder, in a downward column of cylindrical form directed at and into the column of air rising within the cylinder at one side thereof.

2. A two cycle internal combustion engine of the type in which natural gas is used as a fuel, according to claim 1, wherein said means for introducing gas fuel at the top of the cylinder in a column of cylindrical form comprises a valve and a nozzle inwardly beyond the valve having sides which direct the flow of the gas fuel into the space within the cylinder at one side thereof in which said column of air rises.

3. A two cycle internal combustion engine of the type in which natural gas is used as a fuel, comprising a cylinder, a piston, means for introducing air only into the lower part of the cylinder in a column rising at one side of the cylinder, means for introducing, on the compression stroke of the piston, only gas fuel, at the top of the cylinder, in a downward column of cylindrical form directed at and into the column of air rising within the cylinder at one side thereof, and means for imparting vigorous turbulence to the combustble mixture consisting of a shoulder at the upper limit of the piston movement, between which shoulder and the piston an annulus of combustible mixture is squeezed and forced inwardly in swirling currents.

4. A two cycle internal combustion engine comprising a cylinder, a piston, means for scavenging and filling the cylinder with air, means for introducing gas into the cylinder in the early part of the compression stroke of the piston and prior to the approach of the piston to the end of its compression stroke, and means for imparting a vigorous turbulence to the air and gas combustible mixture comprising a shoulder at the upper end of the cylinder slightly beyond the upper limit of the piston movement, between which shoulder and the piston an annulus of combustible mixture is squeezed and forced inwardly in swirling currents.

5. A two cycle internal combustion engine of the type in which natural gas is used as a fuel comprising a cylinder, a piston, means for introducing air only into the lower part of the cylinder in the form of a rising column at one side of the cylinder, for scavenging and filling the cylinder with air, means for introducing only gas fuel at the top of the cylinder comprising a valve and a nozzle inwardly beyond the valve having cylindrical walls which act to direct the flow of gas fuel directly into the rising column of air.

HARMER G. HOOVER.

REFERENCES CITED

The following references are of record in the file of this patent:

UNITED STATES PATENTS

| Number | Name | Date |
| --- | --- | --- |
| 745,215 | Melhuish | Nov. 24, 1903 |
| 1,119,432 | Kerscht | Dec. 1, 1914 |
| 1,541,207 | Burtnett | June 9, 1925 |
| 1,559,997 | Shepherd | Nov. 3, 1925 |
| 1,632,478 | Hubbell | June 14, 1927 |
| 1,664,091 | Sinclair | Mar. 27, 1928 |
| 1,692,150 | Banner | Nov. 20, 1928 |
| 1,721,320 | Signorini et al. | July 16, 1929 |
| 1,791,443 | Clark et al. | Feb. 3, 1931 |

FOREIGN PATENTS

| Number | Country | Date |
| --- | --- | --- |
| 15,625 | Great Britain | of 1904 |
| 455,432 | Great Britain | of 1936 |